(12) United States Patent
Burns

(10) Patent No.: US 6,375,143 B1
(45) Date of Patent: Apr. 23, 2002

(54) RELEASABLE SUCTION CUP

(76) Inventor: Catherine R. Burns, 1052 Burns Trail, Halifax, VA (US) 24558

( * ) Notice: Subject to any disclaimer, the term of this patent is extended or adjusted under 35 U.S.C. 154(b) by 0 days.

(21) Appl. No.: 09/677,221

(22) Filed: Sep. 29, 2000

Related U.S. Application Data

(60) Provisional application No. 60/157,473, filed on Oct. 1, 1999.

(51) Int. Cl.$^7$ .................................. F16B 47/00
(52) U.S. Cl. ...................... 248/363; 40/591; 40/593; 40/597; 160/370.21; 160/DIG. 13; 248/206.4
(58) Field of Search ............... 248/363, 205.5, 248/205.7, 205.8, 205.9, 206.2, 206.3, 206.4; 160/DIG. 13, 370.21; 40/597, 591, 593

(56) References Cited

U.S. PATENT DOCUMENTS

| | | | |
|---|---|---|---|
| 4,736,980 A | 4/1988 | Eubanks | 296/97 D |
| 4,877,074 A | 10/1989 | Castellano | 160/84.1 |
| 5,031,684 A | 7/1991 | Soong et al. | 160/370.2 |
| 5,183,094 A | 2/1993 | Montasham et al. | 160/370.2 |
| 5,318,262 A | * 6/1994 | Adams | 248/205.8 |
| 5,356,191 A | 10/1994 | Sheehan | 296/95.1 |
| 5,553,908 A | 9/1996 | Shink | 296/97.8 |
| 5,588,476 A | * 12/1996 | Trethewey | 248/205.8 |
| 5,611,380 A | * 3/1997 | Landy | 160/370.21 X |
| 5,611,511 A | * 3/1997 | Lee | 248/205.8 |
| 5,992,806 A | * 11/1999 | Adams | 248/205.8 |

* cited by examiner

*Primary Examiner*—Ramon O. Ramirez
(74) *Attorney, Agent, or Firm*—Olive & Olive, P.A.

(57) ABSTRACT

A releasable suction cup is formed with a tab formed integral with its rim, and with a release filament attached to the tab. On assembly of the suction cup with a panel to be mounted to a smooth surface by the suction cup, the release filament is threaded through a hole in the panel so that an end of the release filament is accessible adjacent the panel surface that is opposite from the suction cup. When the panel is mounted with the suction cup to the smooth surface, the suction cup can be released by pulling on the accessible end of the release filament.

A second embodiment of the invention consists of a double-sided suction cup wherein each cup member has a tab with a release filament attached to its tab and threaded through a hole in the panel to be mounted to a smooth surface. With one side of the double-sided suction cup attached to the smooth surface, the release filament connected to that suction cup side remains accessible through the panel to be pulled to release the suction cup.

1 Claim, 1 Drawing Sheet

RELEASABLE SUCTION CUP

This application relates to U.S. Provisional Application Serial No. 60/157,473, filed Oct. 1, 1999, entitled "Two Sided Suction Cup With Opposite Side Tab Release".

FIELD OF THE INVENTION

The invention relates to the field of suction cups and more particularly to suction cup release means.

BACKGROUND OF THE INVENTION

Suction cups are common devices that are useful for temporarily attaching an item, for example a sun shield, to a smooth surface, for example a car window. Suction cups are generally made of impervious, soft, resilient material in the shape of a hollow partial sphere, having a rim that is in a plane. When the suction cup that is attached to a sun shield is pressed against the car window or other smooth surface, the air within the partial sphere is expelled and the ambient atmospheric pressure holds the suction cup to the surface. To remove the suction cup, one lifts an edge of its rim to allow the pressure to equalize within the suction cup and release the attachment suction.

When a sun shield or other planar item has a different design or message on its two major surfaces, for example one surface being decorated with a design and the other surface having a distress message (e.g., "HELP"), a double-sided suction cup is used for permitting the sun shield to be mounted with either of its major surfaces exposed. Such a two-sided sun shield and double sided suction cup combination is disclosed in U.S. Pat. No. 5,553,908 to Shink entitled "Sun Shield Assembly", although mounting the sun shield with either side facing outwardly is not disclosed therein.

In order for one to lift the rim of a suction cup mounting a panel to a surface, one must be able to reach a finger or a tool around the edge of the panel and contact the rim of the suction cup. If the suction cup is in a location that is difficult to access in this manner, releasing the suction cup involves applying sufficient force to overcome, or break, the suction. This release factor is true whether the suction cup is single sided or double sided.

Therefore, it is an object of the present invention to provide a suction cup that can be easily released from a smooth surface to which it is attached.

It is a further object of the present invention to provide a suction cup that can be easily released from a smooth surface to which it is attached regardless of the accessibility of the rim of the suction cup.

It is an additional object of the present invention to provide a double-sided suction cup that can be easily released from a smooth surface to which it is attached regardless of the accessibility of the rim of the suction cup.

These and other objects of the present invention will become apparent through the disclosure of the invention to follow.

SUMMARY OF THE INVENTION

The invention provides a suction cup having a tab that extends outwardly from the rim of the cup with a release filament connected to the tab. The suction cup is assembled to a panel, such as a sun screen, by passing a connector extending axially from the rear portion of the suction cup through an opening in the panel that the suction cup is intended to support. The release filament is threaded through a second opening in the panel to extend on the opposite side of the item from the suction cup rim to which the filament is connected. When one desires to release the suction cup from its suction attachment to a smooth attachment surface, one pulls on the extended end of the release filament to lift the tab and part of the rim of the suction cup, thus releasing the suction force. In alternate embodiments, the suction cup is single sided or double sided, each side having a tab and a release filament.

BRIEF DESCRIPTION OF THE DRAWINGS

In order for the invention to become more clearly understood it will be disclosed in greater detail with reference to the accompanying drawings, in which.

DESCRIPTION OF THE PREFERRED EMBODIMENT

Figure 1:
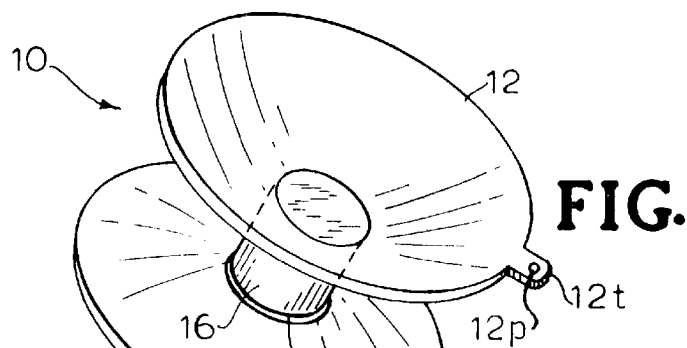
FIG. 1 is a perspective view of a double-sided suction cup of the invention with tabs extending from the rim of each cup.
Figure 2:
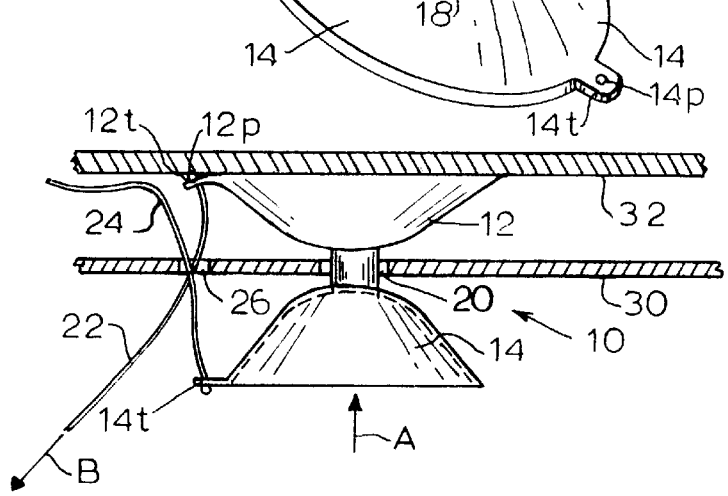
FIG. 2 is a side cross sectional view of the double-sided suction cup of FIG. 1 assembled through a panel mounted to a surface.

According to the objects set forth above, FIG. 1 shows a double-sided suction cup 10 as a first embodiment of the present invention. Double-sided suction cup 10 is comprised of first cup member 12 and second cup member 14 that are co-axial and oriented so that the open end of each cup member 12 and 14 faces in substantially opposite directions from each other. Cup members 12 and 14 are joined by connector pin 16, oriented generally axially of cup members 12 and 14. As best seen in FIG. 2, cup members 12 and 14 are each formed as a hollow cup. While illustrated as spherical, it is recognized that the suction cup can have either a spherical, parabolic, or conical shape. Each cup member 12 and 14 has a rim that resides in a respective plane, the two planes being preferably perpendicular to the axis of connector pin 16. Cup members 12 and 14 are formed of a substantially soft and resilient material, for example rubber or soft vinyl plastic resin, as is known.

The present invention further provides first tab 12*t* formed on the edge of first cup member 12 with hole 12*p* passing therethrough. A similar second tab 14*t* resides on the rim of second cup member 14 and has hole 14*p* passing therethrough. Tabs 12*t* and 14*t* are preferably oriented to extend radially outward from the rim of cup members 12 and 14, respectfully. It is preferred that tab 12*t* and tab 14*t* are circumferentially positioned similarly with respect to connector pin 16 when cup members 12 and 14 are assembled, as seen in FIGS. 1 and 2.

Referring now to FIG. 2, double-sided suction cup 10 is seen in side elevation as assembled with connector pin 16 passing through a panel 30 and cup member 12 mounted to surface 32. Panel 30 may be a sun shield for mounting in a window of an automobile or a sign or other planar member having a substantially greater surface area than the area covered by cup member 12. Connector pin 16 is preferably integrally formed with first cup member 12. Alternatively, connector pin 16 is formed separately and is fixedly inserted into a socket in the rear of first cup member 12. As shown in FIG. 2, connector pin 16 is smaller in diameter than the diameter of suction cup 12 or 14. Connector pin 16 is placed through mounting hole 20 in panel 30 and its free end is anchored into socket 18 in the rear of second cup member 14. Connector pin 16 is preferably fixedly connected to second cup member 14 by known methods, for example chemical welding.

As described above, tab 12t on the edge of first cup member 12 and tab 14t on the edge of second cup member 14 preferably extend radially outwardly from the rim of each respective cup member 12, 14 to reside on the same side relative to connector pin 16. A first release filament, or cord, 22 is attached by knotting or other means at one end thereof to tab 12t, its other end being threaded through release hole 26 in panel 30. Similarly, a second release filament, or cord, 24 is attached at one end thereof to tab 14t, its other end being threaded through release hole 26 in panel 30. Release filaments 22 and 24 each pass through release hole 26 in substantially opposite directions such that the free end of each filament resides on opposite sides of panel 30. The length of each of release filaments 22 and 24 is made sufficient to extend through release hole 26 with enough length residing beyond panel 30 for being grasped. A further option provides a loop or bead (not shown) anchored to the free end of filament 22 and a second loop anchored to the free end of filament 24. Release filaments 22 and 24 are made of a light gauge monofilament plastic, such as fishing line, in the preferred embodiment.

With double-sided suction cup 10 mounted to panel 30, panel 30 can be mounted to a surface thereby, such as attachment surface 32, shown in side cross sectional view in FIG. 2. Attachment surface 32 is preferably a planar, smooth surface, for instance glass. Depending on the size and flexibility of the material forming cup members 12 and 14, a degree of curvature of attachment surface 32 is possible, such as is common in the windshields of vehicles. To attach double-sided suction cup 10 to attachment surface 32, pressure is applied to cup member 14 in the direction indicated by arrow A, partly compressing cup member 12 and expelling air therefrom.

To remove panel 30 from its attachment to attachment surface 32, one grasps release filament 22 and applies a small amount of force in the direction indicated by arrow B, pulling tab 12t away from attachment surface 32 and allowing air to enter the cavity within cup member 12. With the pressure equalized, cup member 12 no longer clings to attachment surface 32 and panel 30 is removed.

As noted above, for various reasons panel 30 could be mounted with either surface thereof facing attachment surface 32. One surface of panel 30 with a two-sided sun shield might be decorated, and the other surface printed with a message. Thus, panel 30 is preferably mounted by means of double-sided suction cup 10 with respective release filaments 22 and 24.

Figure 3:
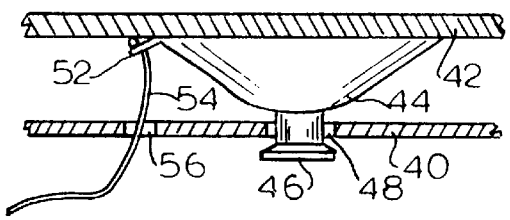
FIG. 3 is a side elevation view of a single-sided suction cup of the invention assembled to a panel for mounting.

The invention further recognizes that the main improvement provided by the present invention, i.e. easy suction cup releasing, is similarly beneficial when applied to a single-sided suction cup such as suction cup 44, shown in FIG. 3. Single-sided suction cup 44 is preferably used in connection with a panel 40 that is intended to always have the same side exposed to view, for example, an advertising sign. Suction cup 44 is integrally molded with connector 46 having a shank portion that is smaller in diameter than the diameter of suction cup 44 and a head portion that is greater in diameter than its shank portion. Connector 46 is integrally formed co-axial with suction cup 44. To assemble suction cup 44 to panel 40, the head portion of connector 46 is placed through connector hole 48 in panel 40 with the rim of suction cup 44 distal from panel 40.

A tab 52 is formed on the rim of suction cup 44 in similar manner to tabs 12t and 14t described above. Release filament 54 is connected to tab 52 at a first end and the second end thereof is threaded through release hole 56 to extend on the opposite side of panel 40. Mounting and releasing single-sided suction cup 44 is accomplished in a similar manner as with the double-sided suction cup 10 described above.

Figure 4:
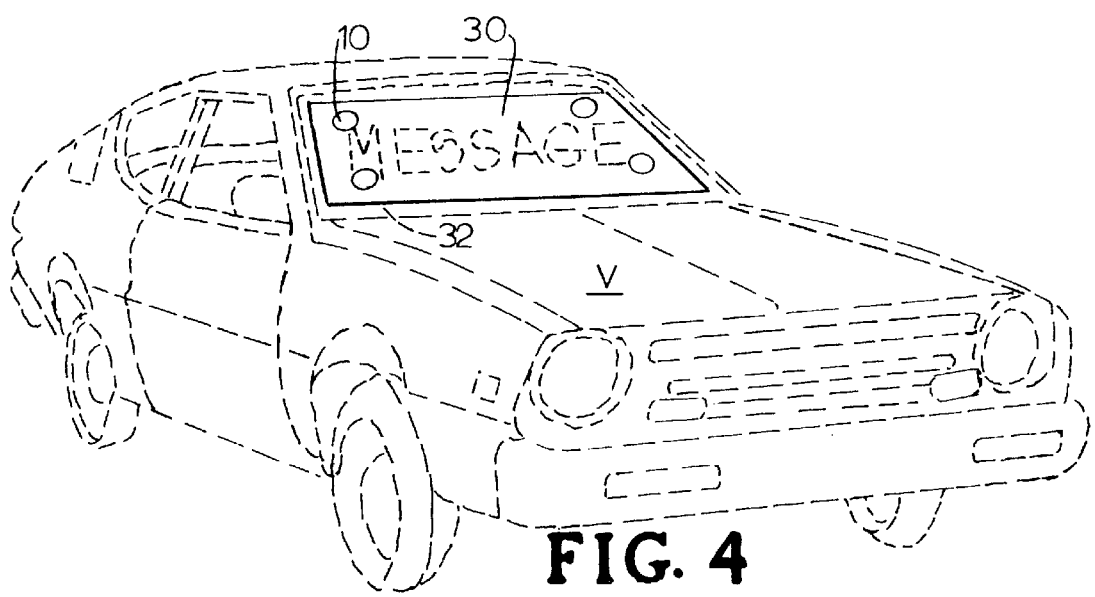
FIG. 4 is a perspective view of a sun shield mounted to the windshield of an automobile by a plurality of suction cups of the invention, the automobile shown in dashed lines and forming no part of the invention.

Referring now to FIG. 4, an automobile V is shown in perspective view in dashed lines with panel 30 mounted to attachment surface 32, being the windshield thereof As described above, panel 30 is fitted with a plurality of suction cups 10, in the illustrated embodiment being four suction cups 10. Panel 30 is shown with a first side displaying a message visible toward the outside of automobile V. The opposite side of panel 30 may have a different message or a decorative design. Mounted in either orientation, panel 30 serves a major function of blocking heat radiation from the car's interior.

The above detailed description of a preferred embodiment of the invention sets forth the best mode contemplated by the inventor for carrying out the invention at the time of filing this application and is provided by way of example and not as a limitation. Accordingly, various modifications and variations obvious to a person of ordinary skill in the art to which it pertains are deemed to he within the scope and spirit of the invention as set forth in the following claims.

What is claimed is:

1. A releasable double-sided suction cup for supporting a panel to an attachment surface, comprising:

a) a first cup member having a cavity with a substantially planar rim and being formed of a substantially soft, resilient material;

b) a second cup member having a cavity with a substantially planar rim and being formed of a substantially soft, resilient material;

c) a connector for connecting the first cup member to the second cup member such that the cavity of the first cup member and the cavity of the second cup member are oriented opposite to one another, the connector positioned through a connecting hole in the panel such that the first cup member resides on one side and the second cup member resides on the other side of the panel;

d) a first tab connected to the rim of the first cup member and extending radially outwardly of the cavity thereof;

e) a first release filament attached at a first end thereof to the first tab, with the second end thereof positioned through a release hole in the panel such that the second end of the release filament resides on the opposite side of the panel from the first cup member;

f) a second tab connected to the rim of the second cup member and extending radially outwardly of the cavity thereof, and g) a second release filament attached at a first end thereof to the second tab, with the second end thereof positioned through the release hole in the panel such that the second end of the release filament resides on the opposite side of the panel from the second cup member.

* * * * *